Figure 1:
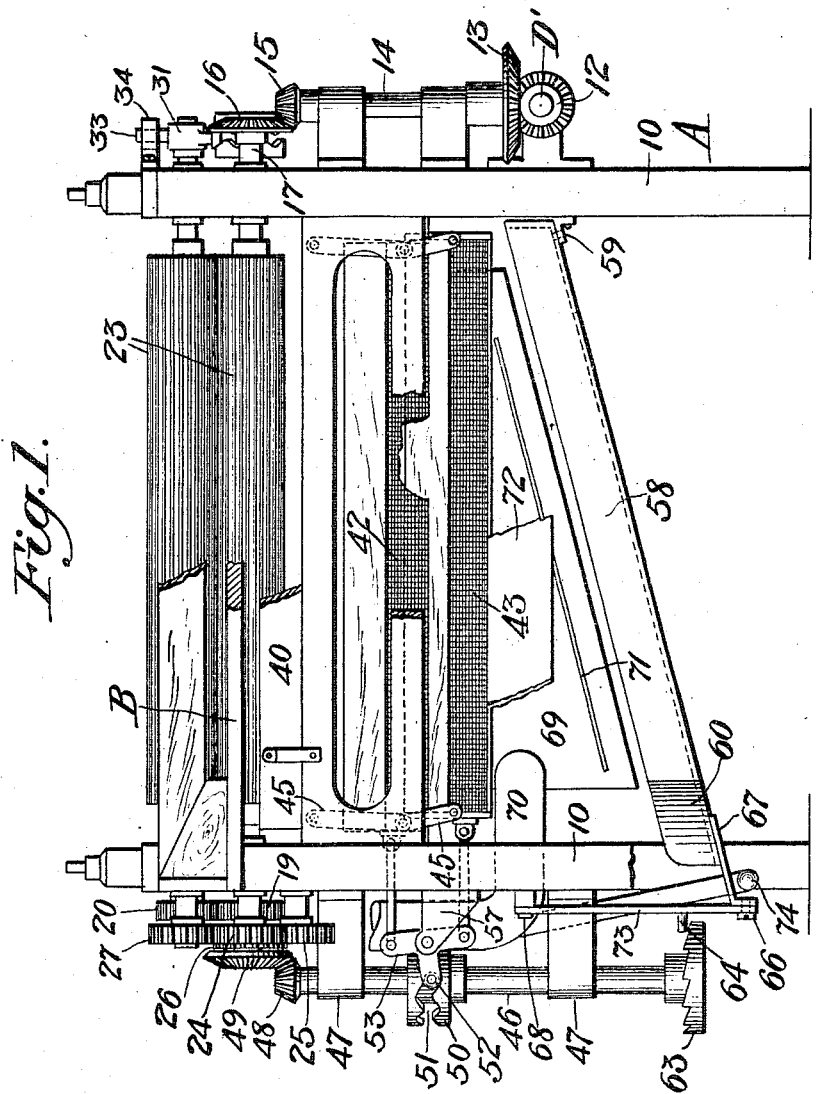

C. G. COOKE.
FLAX THRESHER OR SEEDER.
APPLICATION FILED SEPT. 21, 1912.

1,284,246.

Patented Nov. 12, 1918.
3 SHEETS—SHEET 1.

Witnesses.
Mary E. Fuller
C. F. Marsh

Inventor:
Clayton G. Cooke
by Beach & Fisher
Attorneys.

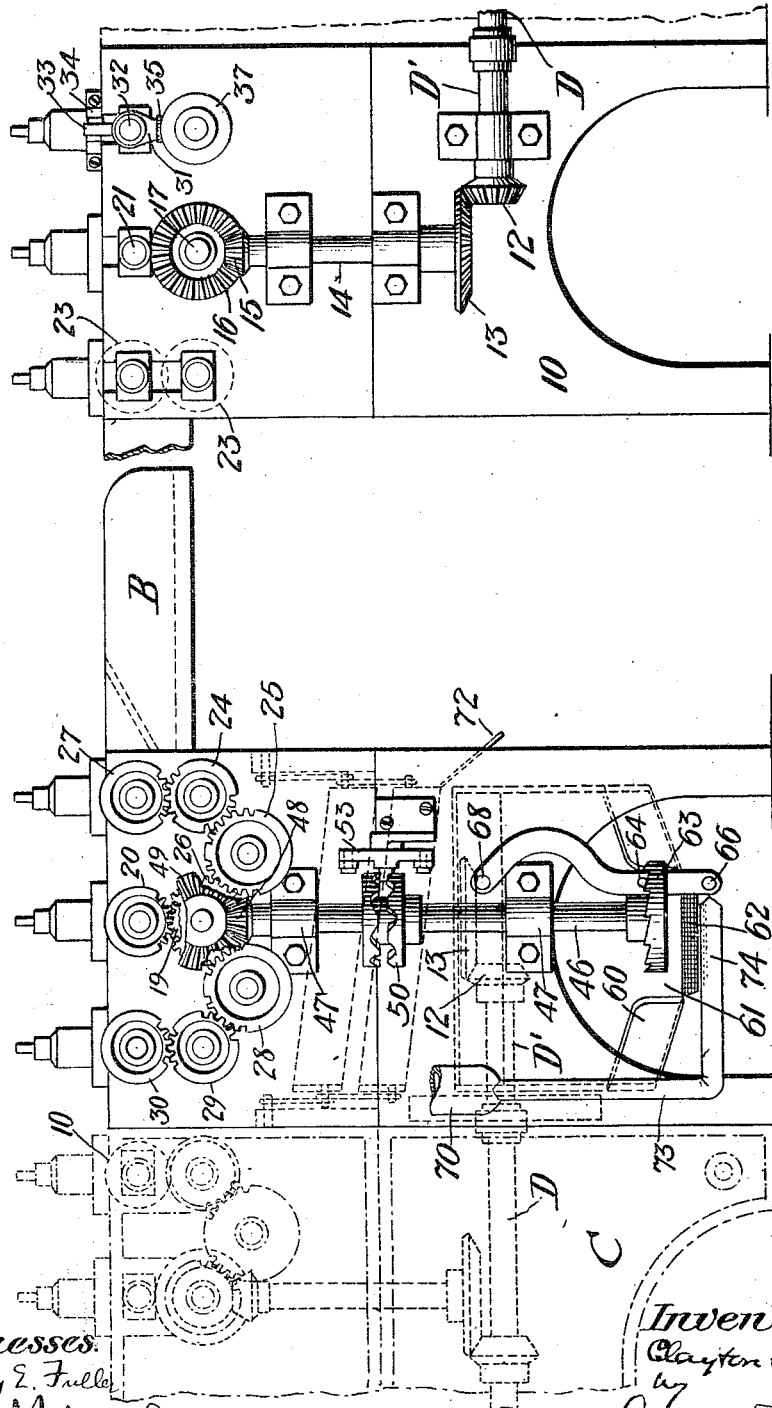

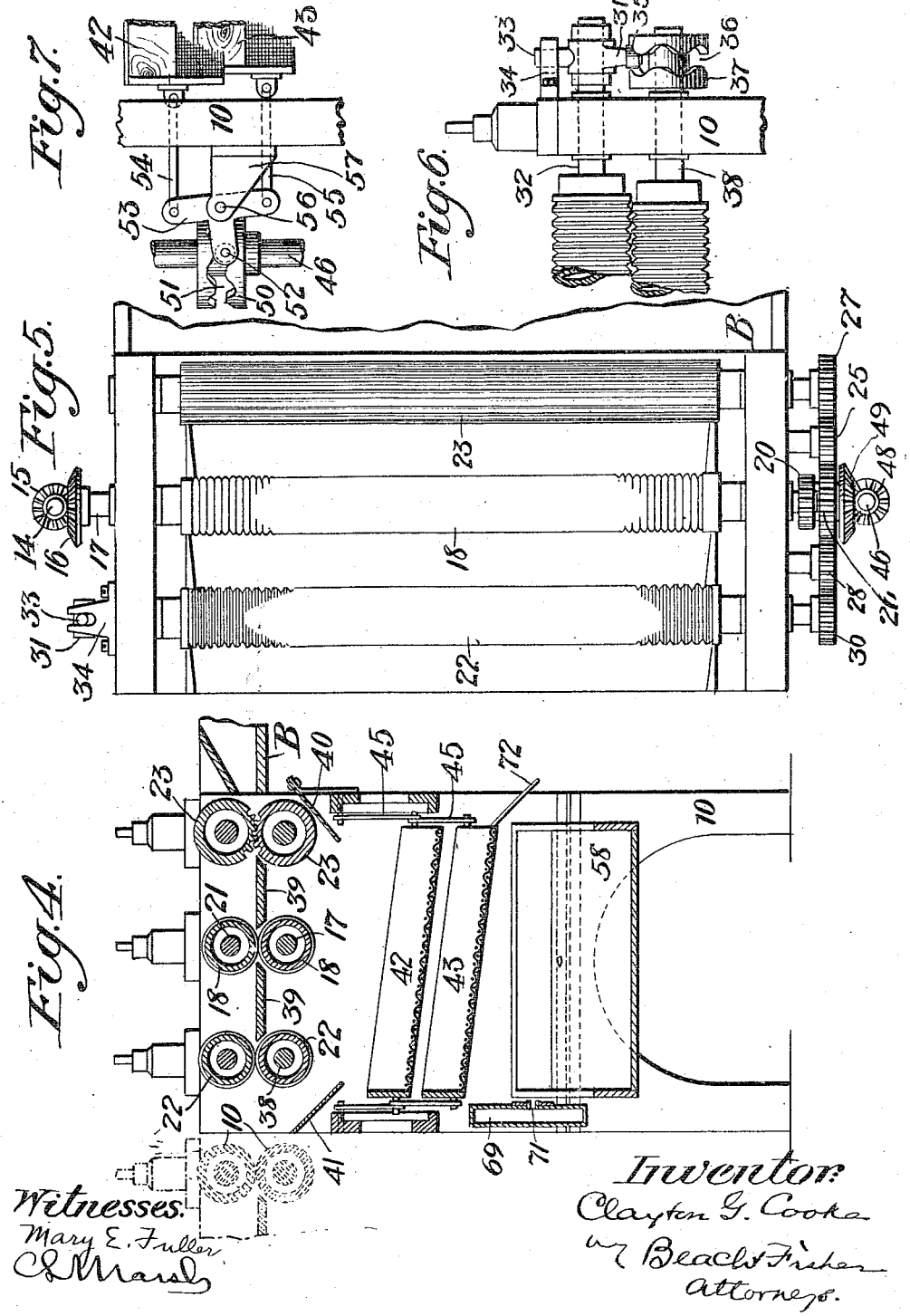

UNITED STATES PATENT OFFICE.

CLAYTON G. COOKE, OF NEW HAVEN, CONNECTICUT, ASSIGNOR TO AMERICAN LINEN FIBRE COMPANY, OF WILMINGTON, DELAWARE, A CORPORATION OF DELAWARE.

FLAX THRESHER OR SEEDER.

1,284,246.      Specification of Letters Patent.      Patented Nov. 12, 1918.

Original application filed June 21, 1912, Serial No. 705,070. Divided and this application filed September 21, 1912. Serial No. 721,680.

*To all whom it may concern:*

Be it known that I, CLAYTON G. COOKE, a citizen of the United States, residing in New Haven, county of New Haven, and State of Connecticut, have invented certain new and useful Improvements in Flax Threshers or Seeders, of which the following is a full, clear, and exact description.

This invention relates to machines for removing the seed from flax and similar plants, and it refers especially to a machine adapted for use in connection or association with a decorticating machine, in order to remove the seed from the stock before such stock is fed to the decorticating machine. This application is a division of my application filed June 21, 1912, Serial No. 705,070, in which I claim the seeding mechanism in combination with the decorticating mechanism, and the present case relates more particularly to the specific features of the seeder or thresher alone.

The objects of the present invention are to provide a form of seeder peculiarly adapted for use ahead of and in combination with a decorticator; to furnish seeding mechanism of maximum efficiency in thoroughly separating the seed from the straw; and to improve a number of general and detail features of the seeding mechanism proper and the means for disposing of the seed.

To these and other ends, the invention consists in the novel combinations and arrangements of parts to be hereinafter described and claimed.

In the accompanying drawings,

Figure 1 is a front end elevation of a seeder constructed in accordance with my invention, certain parts being broken away for the sake of clearness, Fig. 2 is a side elevation of the machine, showing its general arrangement with respect to the decorticating machine, Fig. 3 is a fragmentary side elevation of the seeder looking from the opposite side, Fig. 4 is a vertical longitudinal section of the seeder, Fig. 5 is a top plan view of the same, Fig. 6 is a detail of the vibrating roll, and Fig. 7 is a detail of the means for shaking the screens.

Referring to the drawings, the machine is shown as comprising a frame A comprising side pieces or frames 10. At the front of the frame A is a feed table B. At the rear of the frame A, the seeder is adapted to be placed against the frame of the decorticating machine C, with which it is connected in some appropriate manner. The particular construction of the decorticating machine C is not, of course, material, but such decorticating machine will usually be provided with feed rolls 11 at its front end coöperating with a number of breaking and other rolls (not shown).

Extending along one side of the decorticating machine C is the driving shaft D therefor. This shaft is adapted to be coupled at its front end, by any appropriate means, to the driving shaft D' of the seeding machine, which is mounted on one of the side frames 10, as shown in Figs. 1 and 3. The shaft D transmits rotary motion to the feed rolls 11 of the decorticating machine through suitable transmission mechanism, as indicated by the dotted lines in Fig 2. The shaft D' of the seeder, on the other hand, drives a plurality of separating rolls which constitute the seeding mechanism of the seeder, as will now be described.

At the end of the shaft D' the same carries a bevel gear 12 meshing with a bevel gear 13 on the lower end of a stud shaft 14 mounted on the seeder frame A, and carrying at its upper end a bevel gear 15. The bevel gear 15 meshes with a bevel gear 16 on the shaft 17 of an intermediate separating roll 18 disposed intermediate of the length of the machine, as shown in Fig. 4. Above the roll 18 just mentioned is a similar coacting roll 18. Both of these rolls are suitably journaled in the side frames 10 and the upper roll is driven from the lower roll by means of a gear 19 arranged on that end of the shaft 17 which is opposite the gear 16, said gear 19 being meshed with a gear 20 on the end of the shaft 21 of the upper roll 18.

In advance of the rolls 18 (relative to the direction of feed) is a pair of coöperating rolls 22 located behind the feed rolls 11 of the decorticating machine, while in the rear of the rolls 18 with respect to the direction of feed *i. e.* at the front of the seeder is another pair of coöperating rolls 23 located adjacent the feed table B and between which the straw is directly pushed from said feed table. In practice, the interval between the rolls 23 and the rolls 18 will be approximately equal to that between the rolls 18 and the rolls 22, and approximately the same interval will exist between the rolls 22 and the feed rolls 11 of the decorticator. This interval or distance is less than the ordinary length of the stock or staple, so that each stalk or length of stock will be acted on by at least two pairs of rolls at the same time. In other words, the stock will pass between the rolls of the succeeding pair before leaving the rolls of the preceding pair. The first rolls of the seeder, i. e. the rolls 23, are driven from the lower roll 18 by means of a gear 24 on the lower roll 23 meshing with an idle gear 25 on the machine frame, which idle gear meshes in turn with a gear 26 on the shaft 17 located in front of the gear 19. The upper roll 23 is driven from the lower roll 23 by means of a gear 27 on the shaft of the upper roll meshing with the gear 24 on the shaft of the lower roll. The third pair of rolls 22 is driven from the shaft 17 of the lower roll 18 by means of the gear 26 which meshes with an idle gear 28 engaging in turn a gear 29 on the lower roll 22. The upper roll 22 is driven from the lower roll 22 by means of a gear 30 on the former engaging the gear 29.

Each of the rolls 23 of the first pair is provided throughout its periphery with longitudinal flutes or corrugations. The flutes of the upper roll do not, however, contact with those of the lower roll, for this would cause mashing of the seeds between the rolls, thereby expressing oil therefrom and gumming the rolls and impairing the operation of the machine. In order to avoid this drawback, the rolls 23 are very slightly spaced apart from each other, just sufficiently to avoid mashing of the seed. The next pair of rolls, i. e. the intermediate rolls 18, are provided with rather coarse transverse flutes, as shown in Figs. 4 and 5, and the third pair of rolls 22 are provided with finer transverse flutes. The flutes of the second and third pair of rolls are also spaced from the flutes of the co-acting rolls to such an extent as to prevent any substantial mashing of the seeds. In Fig. 5 the fluting of the second and third pairs of rolls is not fully shown but it is to be understood that the flutes extend over the entire peripheries of the rolls 18 and 22. The upper roll 22 is arranged to vibrate i. e. to reciprocate longitudinally. It is mounted in sliding bearings, and an arm 31 loosely embracing and fixed against longitudinal movement with respect to the shaft 32 of said roll, has an end portion 33 operating in a straight guide 34 on the machine frame. The opposite end of the arm 31 carries a roller 35 operating in a groove 36 of a cam 37 on the shaft 38 of the lower roll 22. In this manner the upper roll 22 will be vibrated or moved lengthwise to a slight extent during its rotary movement, the gear 30 moving longitudinally to a certain extent with respect to the gear 29, as will be obvious.

Between the rolls 23 and 18 is a flat table or plate 39 having beveled edges to permit the dropping of the seeds between said plate and the lower rolls 18 and 23. A similar plate 39 is interposed between the rolls 18 and the rolls 22. At the front of the machine is an inclined guard 40 beneath the rolls 23 to deflect inwardly the seeds dropping from said rolls, and a similar deflecting member or guard 41 is located at the rear of the machine i. e. in advance of the rolls 22 with respect to the direction of feed. These guards 40, 41, assist in deflecting downward beneath the rolls all of the seed separated out by said rolls, and the falling seed is first received in a vibrating sieve 42 below which is a similar vibrating sieve 43. The sieves 42 and 43 are suspended in the frame of the machine in a well known manner by means of links 45, and said sieves are reciprocated longitudinally in opposite directions by mechanism actuated by an upright stud shaft 46 located at the side of the machine opposite the driving shaft D'. The shaft 46 is journaled in suitable brackets 47 on one of the side frames 10 and carries at its upper end a bevel gear 48 meshing with and driven by a bevel gear 49 on the shaft 17 of the lower roll 18. Fixed to the intermediate portion of the shaft 46 is a cam 50 having a cam groove 51 in which operates a roller 52 carried by a cross-head 53 connected at its respective ends with the sieves 42 and 43 by means of links 54 and 55 respectively, as best shown in Fig. 7. The cross-head 53 is pivoted at 56 to a bracket 57 on the adjacent side frame 10, and as said cross-head is rocked or vibrated on its pivot by the rotation of the cam 50 the sieves or screens 42 and 43 will be reciprocated lengthwise in opposite directions, as will be understood.

Beneath the screens 42 and 43 is a vibrating chute 58 pivoted to one of the side frames at 59 and inclined downward from the pivot, as shown in Fig. 1. The chute 58 is provided with suitable upright side walls which are converged at its lower end, as shown at 60, to provide a discharge spout 61 at one side of the machine, the spout portion being provided with a small tip section 62 of foraminous material, the purpose of which will hereinafter appear. The chute 58 is given a vibratory swinging movement in a lateral direction on its pivot 59 by means of a ratchet cam 63 on the lower end of the shaft 46, the teeth of which cam are adapted to engage a pin 64 on a lever 65 pivoted at its lower end by a pivot 66 to a bracket or strip 67 fixed to the free end of the chute 58. The lever 65 is pivoted at 68 to one of the side frames 10, at the upper end of the lever, so that the latter acts as an oscillatory support for the free end of the chute 58. As the ratchet cam 63 is rotated by the rotation of the shaft 46, the teeth of said cam successively engage the pin 64 on the lever 65, and the chute 58 is thereby given movements in a lateral direction, the alternating return movements being produced by the tendency of the parts to assume by gravity their normal position. In this manner, the chute is given a short, quick vibratory motion in a lateral direction to shake down toward and through the discharge spout 61 of the chute the seed dropping from the lower sieve or screen 43. At the back of the machine and somewhat above the chute 58 is an air chest or chamber 69 supplied with air under pressure from a suitable source, fed to said chest or chamber by means of a flue or duct 70. At the lower porton of the chamber or chest 69 is a comparatively narrow slit 71 through which the air issues in a thin film which passes forwardly over the chute 58 toward the front of the machine to thereby separate the falling chaff from the seed and blow it out at the front of the machine, although the chaff is prevented from passing up at the front of the machine, as it meets a depending guard 72 overhanging the chute 58 and partially inclosing the space above the same. A small duct 73 leads downward from the main air flue 70 and is directed laterally at 74 so as to extend beneath the foraminous or perforated portion 62 of the discharge spout of the chute. The tip of said air duct is provided with a number of perforations, as shown in Fig. 2, through which air is discharged through the interstices of the foraminous portion 62 for the purpose of blowing away the chaff and preventing it from passing with the seed to the receptacle or container which is usually placed beneath the discharge spout to receive the seed.

The operation of the machine is substantially as follows: The sizes of the transmission gears of the seeding rolls are so chosen that the first pair of rolls 23 is rotated somewhat faster than the second pair of rolls 18. The third pair of rolls 22 is rotated faster than the intermediate rolls 18 and preferably a little faster than the first rolls 23. Moreover the third rolls 22 are driven slightly faster than the smooth feed rolls 11 of the decorticating machine C. The flax or other stock to be seeded is placed on the feed table B and pushed into the bite of the longitudinally fluted or corrugated rolls 23. These rolls, as previously explained, do not contact with each other and in fact do not come so close to each other as to mash the seed. The function of these spaced rolls is to roll the stock thoroughly in one direction, breaking the seed pods along lines corresponding to the direction of the flutes of the rolls. From the rolls 23 the stock passes to the intermediate rolls 18 which rotate somewhat more slowly, so that there will be no tendency for the long fiber of the stock to be broken as it passes from one pair of rolls to another. Of course, the long fiber must not be broken in the seeder if it is desired to produce long fiber in the decorticating machine and in the present case the second or intermediate rolls 18 rotate so much more slowly than the first rolls that the stock loops up in passing from the first rolls to the second rolls so that the fiber is relieved of tension. The intermediate rolls 18 roll the stock on lines offset from the lines on which it has previously been rolled by the rolls 23. In the embodiment shown, the flutes or corrugations of the rolls 18 and 23 respectively extend at right angles to each other, to insure the breakage of the seed pods along quite different lines, but this arrangement need not be adhered to under all circumstances. The seeds which are shaken out of the broken pods either pass down in front of the first rolls 23 and are deflected into the sieve 42 by the deflector or baffle 40, or they pass downward into said sieve through the openings left at the margins of the table or plate 39. From the intermediate rolls 18 the stock passes over the next table 39 to the third rolls 22. These rolls are fluted or corrugated in the same direction as the rolls 18, and hence as there will be no tendency for the long fiber to be broken by tension between the rolls in question, the third rolls 22 may be driven faster than the intermediate rolls, as previously explained. The flutes of the third rolls 22 break the seed pods on new lines owing to the difference in the fineness of the flutes, and as the upper roll 22 is vibrated lengthwise by the mechanism hereinbefore described, there is a rolling action substantially at right angles to the direction of feed, which is especially effective in further breaking up the seed pods and in rolling and separating the seed out of the pods. In the particular example shown, the first rolls break the seed pods along lines directed transversely to the line of feed, the second rolls then break the pods along lines parallel to the line of feed, and the rolls 22 roll the pods in a direction transverse to the line of feed so as to dislodge the seed in an effective way from the broken pods and cause it to drop into the upper sieve. The rolls of each pair are so spaced from each other that their flutes do not crush the seeds or the fiber in the stalks, although the seed pods are effectively disintegrated. From the rolls 22, the stock passes directly to the smooth feed rolls 11 of the decorticating machine, said feed rolls being driven somewhat slower than the rolls 22 in order to permit the stock to loop up in the interval between the rolls in question and thereby prevent breakage of the long fiber. It has been found in actual practice that the seeding rolls will take all of the seed out of the stock before the latter passes to the feed rolls of the decorticating machine, so that the parts of the decorticating machine are prevented from being gummed up by the crushing of the seed. In other words, there is no trouble encountered in the decorticating machine due to the presence of seed in the fiber being decorticated.

It will readily be understood from what has been said above, that the seed separated out by the seeding rolls passes successively from the sieve 42 to the sieve 43 and thence to the discharge chute 58 beneath which a suitable receptacle or a conveyer is placed to catch the falling seed. By the use of the air blast in the manner described, the seed thus collected will be quite clean and it may or may not be subjected to the ordinary fanning process, as may be desired.

Of course, I have not attempted to describe the numerous modifications of the construction which may be adopted without departing from the invention. While the described manner of fluting the seeding rolls and the particular speeds at which such rolls are driven relatively to each other and to the feed rolls of the decorticating machine, are of importance in certain aspects of the invention, these and other features are susceptible of many variations in other aspects of the invention. It will be obvious, also, that if desired the seeder may be built into the decorticating machine instead of having its side frames separate from those of the decorticating machine. It has been found more convenient, however, to manufacture the seeder in the form of a separate machine, as shown and described.

What I claim is:

1. In a flax seeder, the combination of a pair of seeding rolls having flutes, a second pair of seeding rolls having flutes arranged in a different direction than the flutes of the first rolls, the rolls of each pair being so spaced from each other as to disintegrate the seed pods without breaking the fiber in the stock, and without separating the fiber, and means to drive said rolls at such relative speeds that the stock loops up in passing from the first pair to the second pair; substantially as described.

2. In a flax seeder, the combination of a pair of seeding rolls having longitudinal flutes or corrugations, a second pair of seeding rolls following the first pair and having transversely arranged flutes or corrugations, the rolls of each pair being so spaced from each other and having their flutes so formed as to disintegrate the seed pods without disintegrating the fiber in the stock, a third pair of rolls for removing the seed from the disintegrated seed pods, and means to drive the intermediate pair of rolls at less speed than the preceding and succeeding pair of rolls to relieve the fiber of tension; substantially as described.

3. In a flax seeder, the combination of a pair of seeding rolls having longitudinally extending flutes, a second pair of seeding rolls having transverse flutes, the seeding rolls of each pair being so spaced from each other and having their flutes so formed as to break up the seed pods without breaking the fiber in the stock, and means for imparting an endwise reciprocating movement to at least one of said rolls for rolling the seed pods in a transverse direction with respect to the line of feed; substantially as described.

4. In a seeder for flax machines, the combination of a pair of seeding rolls having longitudinal flutes or corrugations, and two pairs of seeding rolls following said first rolls, and having transversely arranged flutes or corrugations, the transverse flutes of one pair of rolls being of different form than those of the other pair of transversely fluted rolls, all of said rolls being so spaced from each other as to disintegrate the seed pods without breaking the fiber in the stock; substantially as described.

5. In a flax seeding machine, the combination of a pair of seeding rolls having flutes for breaking the seed pods along certain lines, and a second pair of rolls having flutes for breaking the seed pods along other differently directed lines, the rolls of each pair having their flutes spaced from each other at such a distance as to prevent the mashing of the seeds sufficiently to express the oil from the same, and the respective pairs of rolls being driven at such relative speeds as to relieve the fiber in the stalks from tension; substantially as described.

6. A flax seeder, comprising a first pair of longitudinally fluted rolls, a second pair of transversely fluted rolls driven slower than the first pair of rolls, and a third pair of rolls having transverse flutes, at least one of the rolls of said third pair being a vibratory roll and the rolls of each pair being so constructed and spaced as to prevent substantial mashing of the seeds; substantially as described.

7. A flax seeder, comprising a first pair of longitudinally fluted rolls, a second pair of transversely fluted rolls driven slower than the first pair of rolls, and a third pair of rolls having transverse flutes, at least one of the rolls of said third pair being a vibratory roll, and said third pair of rolls being driven faster than the second pair, the rolls of each pair being so constructed and spaced as to prevent the expressing of oil from the seeds; substantially as described.

8. In a flax seeder, the combination of a pair of longitudinally fluted rolls, succeeding pairs of transversely fluted rolls, the rolls of each pair being spaced from each other at such a distance as to prevent the substantial mashing of the seeds, means to drive the transversely fluted rolls at successively increasing speeds, and means to drive the longitudinally fluted rolls faster than the succeeding pair of transversely fluted rolls; substantially as described.

9. In a flax seeding machine, the combination of a plurality of pairs of rolls adapted to break the seed pods along different lines, means to drive said rolls at such relative speeds that the stock is relieved of tension during its passage through the machine, and means to vibrate at least one of said rolls in a lengthwise direction, each of said rolls being spaced from the co-acting roll at such a distance as to prevent crushing pressure on the seeds; substantially as described.

10. The method of removing seeds from flax, which comprises breaking the seed pods along certain lines while they remain on the stalks, by rolling pressure so exerted as to prevent such mashing of the seeds as would express oil from the same, then breaking the pods along new and different lines without mashing the seeds, and then rolling the broken pods so as to dislodge the seed therefrom; substantially as described.

11. In a flax seeding machine, the combination of a pair of seeding rolls having flutes for breaking the seed pods in a certain direction, a second pair of rolls having flutes for breaking the seed pods in a different direction, and a third pair of fluted rolls of which at least one roll is a vibratory roll for giving the broken pods a rolling movement to dislodge and drop the seed, the rolls of each pair having their flutes spaced from each other at such a distance as to prevent the crushing of the seeds or the fiber; substantially as described.

12. The method of removing seed from flax, which comprises breaking the seed pods along certain lines while they remain on the stalks, by exerting rolling pressure on the flax, then breaking the pods along different lines by again subjecting the flax to rolling pressure, and then rolling the broken pods so as to dislodge the seed therefrom, and cause it to drop out of the pods, the means for exerting rolling pressure in each step being spaced apart a sufficient distance to prevent the crushing of the seeds or the fiber; substantially as described.

13. The method of removing seed from flax prior to decortication of the flax, which comprises breaking the seed pods along certain lines while they remain on the stalks, by exerting rolling pressure upon the flax so applied as to prevent mashing of the seeds, breaking the seed pods along new and different lines by a generally similar operation without mashing the seeds, then rolling the broken pods so as to dislodge the seeds therefrom, and relieving the stalks of the flax from tension during the aforesaid operations to prevent rupture of the fiber.

In witness whereof, I have hereunto set my hand on the 20th day of September, 1912.

CLAYTON G. COOKE.

Witnesses:
 HENRY E. ROCKWELL,
 M. OLIVE WILLIAMS.

Copies of this patent may be obtained for five cents each, by addressing the "Commissioner of Patents, Washington, D. C."